US005664312A

United States Patent [19]

Sasaki et al.

[11] Patent Number: 5,664,312

[45] Date of Patent: Sep. 9, 1997

[54] METHOD OF DETACHING A DRIVER BIT FROM A SCREWDRIVER AND A STOP RING PROVIDED WITH A FUNCTION OF REMOVING THE DRIVER BIT APPROPRIATE FOR PRACTICING THE METHOD

[75] Inventors: Katsuhiko Sasaki; Toshiyuki Kani; Yukihiko Yamada, all of Anjo, Japan

[73] Assignee: Makita Corporation, Anjo, Japan

[21] Appl. No.: 651,527

[22] Filed: May 22, 1996

[30] Foreign Application Priority Data

May 24, 1995 [JP] Japan .................................... 7-124988

[51] Int. Cl.$^{6}$ ...................................................... B23P 19/00

[52] U.S. Cl. ........................ 29/426.1; 29/426.5; 81/180.1

[58] Field of Search ................................ 29/426.1, 426.5, 29/267; 81/180.1

[56] References Cited

U.S. PATENT DOCUMENTS 4,100,663 7/1978 Crum ..................................... 29/426.1
4,174,646 11/1979 Kotler .................................... 81/180.1

FOREIGN PATENT DOCUMENTS 2189727 11/1987 United Kingdom .................. 81/180.1
2219539 12/1989 United Kingdom .................. 81/180.1

*Primary Examiner*—S. Thomas Hughes
*Assistant Examiner*—Tisa Stewart
*Attorney, Agent, or Firm*—Davis and Bujold

[57] ABSTRACT

To obviate the necessity of a plier or other tool for extracting a driver bit from a screwdriver, and prevent an adjustment sleeve detached from the screwdriver from being lost. The stop ring has an oval dusting opening having a width wider than the distance between the opposite sides of the hexagonal cross section of the driver bit and narrower than the diagonal length of the cross section. After detaching the adjustment sleeve from the screwdriver, the parallel sizes of the oval dusting opening of the stop ring are aligned with the opposite sides of the driver bit, and the stop ring is moved toward the driver bit, until a peripheral groove portion of the driver bit reaches the edge surrounding the dusting opening. By changing the relative angle between the adjustment sleeve and the driver bit, the diagonal part of the driver bit is caught by the edge surrounding the oval dusting opening. Subsequently, by pulling the adjustment sleeve with the stop ring attached thereto, the driver bit can be extracted from the screwdriver against the urging force of a steel ball provided on the screwdriver.

5 Claims, 7 Drawing Sheets

INSERT

ROTATE

EXTRACT

METHOD OF DETACHING A DRIVER BIT FROM A SCREWDRIVER AND A STOP RING PROVIDED WITH A FUNCTION OF REMOVING THE DRIVER BIT APPROPRIATE FOR PRACTICING THE METHOD

FIELD OF THE INVENTION

This invention relates to a method of detaching a driver bit from a screwdriver and a stop ring provided with a function of removing the driver bit appropriate for practicing the method.

BACKGROUND OF THE INVENTION

A tip Of a screwdriver, conventionally used in an industrial field, is shown in FIG. 10. Conventionally, a screwdriver 100 is provided with a driver bit 110 having cross-shaped tips 111, 113 on both ends thereof. Only by switching the attachment direction of the driver bit 110 for use, the driver bit 110 can be durable twice as long as a driver bit having only one driver tip. The driver bit 110 normally has a hexagonal cross section, and peripheral groove portions 115 and 117 are formed, respectively, at a given interval in the axial direction of the driver bit 110. For attachment, the driver bit 110 is inserted in a hexagonal engagement hole 101 provided in a body 104 of the screwdriver 100, and a steel ball 103 is engaged with the peripheral groove portion 115 or 117 with an urging force applied by a leaf spring 102, such that the driver bit 110 is prevented from coming off the engagement hole 101. In addition, an exposed tip of the driver bit 110 is short, and can be manually extracted with difficulty from the engagement hole 101.

A plier or other tool is required for an operator to pull the driver bit 110 from the engagement hole 101.

Furthermore, while replacing the driver bit 110, the operator has to remove the adjustment sleeve 105 from the screwdriver 100 and put aside an adjustment sleeve 105. Therefore, the adjustment sleeve 105 might be lost on site.

SUMMARY OF THE INVENTION

Wherefore, an object of the present invention is to obviate the necessity of a plier or other tool and prevent an adjustment sleeve from being lost.

To attain this or other object, the present invention provides a method of detaching a driver bit from a screwdriver, in which an adjustment sleeve is detached from the screwdriver, a shaft of the driver bit is inserted in a dusting opening provided in a peripheral wall of a stop ring at the tip of the adjustment sleeve, the edge surrounding the dusting opening is placed and engaged in the peripheral groove portion in the shaft of the driver bit, and the driver bit is pulled out of the screwdriver.

An operator first removes the adjustment sleeve from the screw driver, inserts the shaft of the driver bit in the dusting opening, places and engages the edge surrounding the dusting opening in the peripheral groove portion in the shaft and pulls the driver bit out of the screwdriver. Consequently, the operator can detach the driver bit from the screwdriver without using a plier or other tool.

In the method, the removing of the adjustment sleeve is an indispensable step. Therefore, no step adds to the method. The removed adjustment sleeve can be used as a tool for extracting the driver bit from the screwdriver. Furthermore, the operator is prevented from leaving behind the adjustment sleeve.

The adjustment sleeve can be tilted such that the edge surrounding the dusting opening is caught in the peripheral groove portion. Alternatively, as explained later, an opening having a specified configuration is provided in the stop ring of the adjustment sleeve, and the adjustment sleeve is rotated or slid, such that the edge surrounding the opening is engaged with the peripheral groove portion of the shaft of the driver bit.

When at least two dusting openings are opposed traversing through the stop ring, the adjustment sleeve is tilted, such that the edge surrounding the first opening in the forward end side of the stop ring is engaged in the peripheral groove portion in the drill bit, and the edge surrounding the second opening in the rear end side of the stop ring is placed in contact with the tip of the driver bit. An extracting force can thus be easily applied to the driver bit.

To practice the aforementioned method, the present invention provides a stop ring provided with a function of extracting a driver bit from a screwdriver. The stop ring is formed on a tip of an adjustment sleeve detachably attached to the tip of the screwdriver. A dusting opening formed in the stop ring has a size sufficient for receiving the driver bit and the edge surrounding the opening is hardened by heat treating the material of the stop ring. At least two dusting openings are provided traversing through the stop ring. The stop ring has a sufficient diameter, such that when the edge surrounding the first opening is engaged in the peripheral groove portion in the driver bit, the tip of the driver bit is exposed from the second opening.

Different from the conventional stop ring, the stop ring of the present invention is provided with the dusting opening having a sufficient size for receiving the shaft of the driver bit, and being defined by a hardened edge.

The steel material of the stop ring is hardened by quenching, carburizing, nitriding or other, such that the edge surrounding the dusting opening formed in the stop ring can be hardened.

According to the present invention, the shaft of the driver bit is inserted in the dusting opening in the stop ring, and the edge surrounding the dusting opening can be engaged in the peripheral groove portion in the shaft of the driver bit, for example, by tilting the adjustment sleeve. Subsequently, just by pulling the adjustment sleeve, the driver bit can be extracted from the screwdriver. The peripheral groove portion of the driver bit can be firmly and repeatedly held by the hardened edge surrounding the dusting opening formed in the stop ring. The stop ring can bear such repeated usage as the tool for extracting the driver bit.

In the method of extracting the driver bit from the screwdriver according to the present invention, by rotating or moving the driver bit in the dusting opening in the stop ring, the peripheral groove portion in the driver bit is caught in the narrower part of the dusting opening. The peripheral groove portion formed in the shaft of the driver bit can be firmly caught, and is advantageously prevented from being disconnected from the stop ring even if the drive bit is strongly extracted.

To practice the aforementioned method, the present invention provides a stop ring formed in an adjustment sleeve detachably attached to the tip of a screwdriver for adjusting a screwing depth. A dusting opening formed in the top ring has an inserting part into which the driver bit detachably attached to the screwdriver can be inserted, and a narrower part having a diameter smaller than the diameter of the shaft of the driver bit, such that the peripheral groove portions can be caught in the narrower part, by rotating or moving the driver bit relative to the inserting part of the dust opening.

To extract the driver bit from the screwdriver, first the adjustment sleeve is removed, and the driver bit is inserted through the inserting part of the dusting opening in the stop ring, until the peripheral groove portion in the shaft of the driver bit reaches the inserting part. Subsequently, by slightly rotating or moving the driver bit, the shaft of the driver bit is caught by the edge surrounding the dusting opening in the stop ring. With the peripheral groove portion of the driver bit engaged with the edge surrounding the dusting opening in the stop ring, the adjustment sleeve is pulled, thereby extracting the driver bit easily from the screwdriver.

Therefore, the necessity of a plier or other tool for extracting the river bit is obviated, no step is added to the method process, and no adjustment sleeve is left or lost. Such advantages can be obtained just by adjusting the dimension of the conventional dusting opening in the stop ring. Furthermore, such stop ring can be easily manufactured.

As aforementioned, the peripheral groove portion of the driver bit can be engaged with an edge surrounding a large dusting opening. The dusting opening of the present invention, however, has a narrower part having a size smaller than a diameter of the driver bit, such that the peripheral groove portion in the shaft of the driver bit can be firmly engaged in the edge surrounding dusting opening and the driver bit can be easily pulled out of the screwdriver. The provision of the narrower part of the dusting opening can permit a strong extracting force to be applied to the driver bit, even if it is extracted with difficulty. The stop ring can act as a tool for extracting the driver bit, obviating the necessity of a plier or other.

Especially, when the peripheral groove portion of the driver bit is engaged with the edge surrounding the dusting opening of the stop ring by rotating the driver bit, the narrower part is wider than the distance between the opposite sides of the cross section having n-sides (n is natural number, at least 2) of the driver bit and narrower than the diagonal length of the cross section of the driver bit.

In this configuration, after removing the adjustment sleeve from the screwdriver, the driver bit is inserted into the dusting opening in the stop ring provided on the adjustment sleeve such that the opposite sides of the cross section of the driver bit goes through the dusting opening, until the peripheral groove portion of the driver bit is reaches the edge surrounding the dusting opening. By slightly rotating the drive bit, the diagonal part of the driver bit is caught by the edge surrounding the dusting opening. Subsequently, the adjustment sleeve is manually pulled, thereby easily extracting the driver bit from the screwdriver.

When the driver bit is rotated, the operation is carried out easily, and it can be more easily confirmed that the peripheral groove portion of the driver bit is caught by the edge surrounding the dusting opening of the stop ring, as compared with when the driver bit is moved. Once the peripheral groove portion of the driver bit is caught by the edge surrounding the dusting opening by rotating the driver bit, the driver bit can be surely held and extracted even if the operator's hand slips off.

The sides of the narrower part are desirably parallel with each other for easily catching the peripheral groove portion of the driver bit. Even if the peripheral groove portion of the driver bit deviates from the dusting opening of the stop ring, the narrower part of the dusting opening can be firmly engaged with both ends of the diagonal length of the cross section having n-sides of the drive bit. The driver bit can be securely held even if strongly pulled.

The edge surrounding the dusting opening of the stop ring is also hardened by heat treatment of the material of the stop ring.

BRIEF DESCRIPTION OF THE DRAWINGS

The invention will now be described, by way of example, with reference to the drawings, in which.

DETAILED DESCRIPTION OF THE PREFERRED EMBODIMENTS

Figure 1:
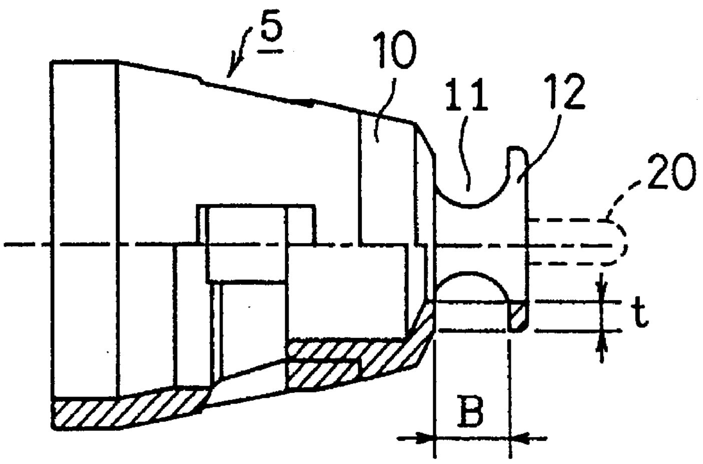
FIG. 1 is a diagrammatic representation showing an adjustment sleeve with a stop ring of a first embodiment attached thereto, the upper half of the figure shows the appearance of the adjustment sleeve and the lower half shows the cross section of the adjustment sleeve.
Figure 2:
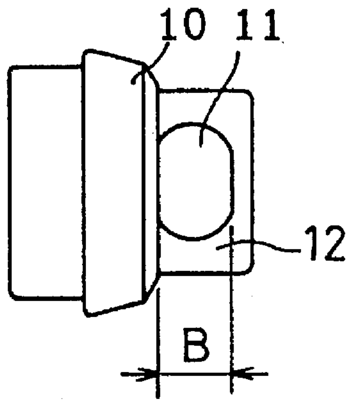
FIG. 2 is a plan view showing the stop ring of the first embodiment.

In a screwdriver according to a first embodiment, as shown in FIGS. 1 and 2, a stop ring 10 is integrally formed with an adjustment sleeve 5 formed of resin. Two oval openings 11, from which dust is normally exhausted, having a width B of 6.5 mm are opposed at an angle of 180 degrees in a peripheral wall of a cylindrical body 12 of the tip of the stop ring 10. The edge surrounding the oval opening 11 has a thickness t of 2 mm. The stop ring 10 is formed by forging S15C steel according to Japanese Industrial Standards. When the screwdriver is used, as shown by a dotted line in FIG. 1, the tip of a driver bit 20 is exposed from the tip of the stop ring 10.

Figure 3A:
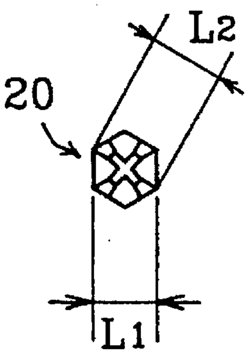
FIG. 3A is a front view of a driver bit and FIG. 3B is a plan view of the driver bit.
Figure 3B:
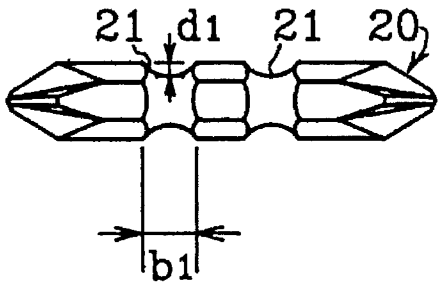

The driver bit 20, as shown in FIGS. 3A and 3B, has a hexagonal cross section. In the driver bit 20, a length L1 between two opposite faces is 6.35 mm, a diagonal length L2 is 7.34 mm, a width b1 of each peripheral groove portion 21 is 4.6 mm and a depth d1 of the peripheral groove portion 21 is 1.27 mm. The parallel narrower part defining by the oval openings 11 for exhausting dust, provided in the stop ring 10, is longer than one side of the cross section of driver bit 20, is wider than the length L1, and narrower than the diagonal length L2. The edge surrounding the opening 11 has a thickness t such that the edge can engage in the peripheral groove portion 21 around the shaft of the driver bit 20.

Figure 4A:
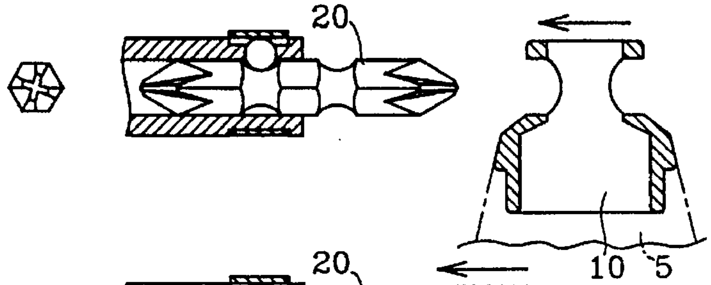
FIGS. 4A–4F are explanatory view showing a method of extracting the driver bit of the first embodiment.
Figure 4B:
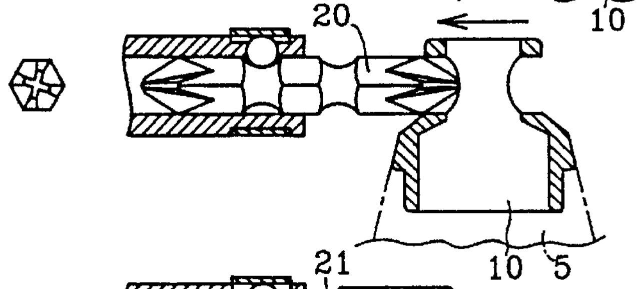
Figure 4C:
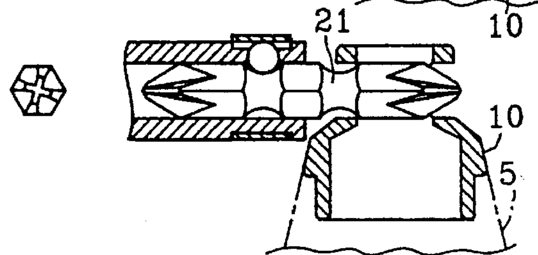
Figure 4D:
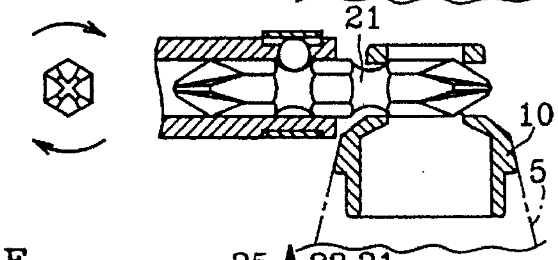
Figure 4E:
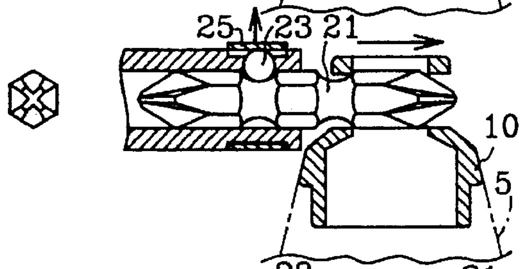
Figure 4F:
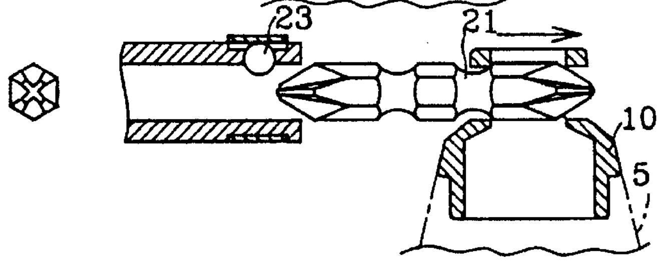

When the adjustment sleeve 5 is detached from the body of the screwdriver, as shown in FIGS. 4A through 4C, the opposite faces of driver bit 20 are aligned with the parallel narrower parts defining the oval openings 11, and the stop ring 10 is moved toward the driver bit 20 until the peripheral groove portion 21 is contacted with the edge defining the narrower part. Subsequently, by rotating the adjustment sleeve 5 or the driver bit 20, thereby changing the relative angular relationship therebetween, as shown in FIG. 4D, the edge surrounding oval opening 11 engages with diagonally opposed parts of the driver bit 20. In such condition, just by pulling the adjustment sleeve 5, the steel ball 23 is pushed upwards against the urging force of the leaf spring 25, and the driver bit 20 can be extracted.

Therefore, an operator need not take with him/her a plier or other for detaching the driver bit, and never leaves the adjustment sleeve behind.

In the embodiment, the stop ring 10 is hardened by heat treating a forged S15C steel, according to Japanese Industrial Standards, through carburizing process, and has a strength such that it can catch and extract the driver bit 20 repeatedly many times.

Figure 5A:
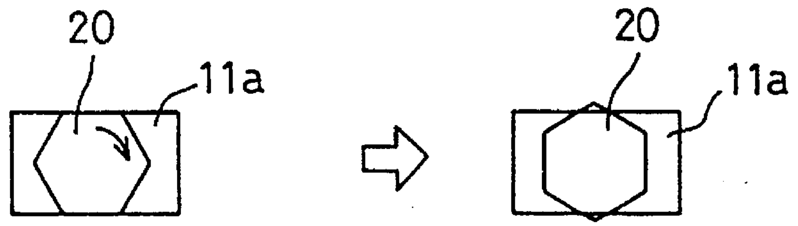
FIGS. 5A–5D are explanatory view showing the modifications of a dusting opening.
Figure 5B:
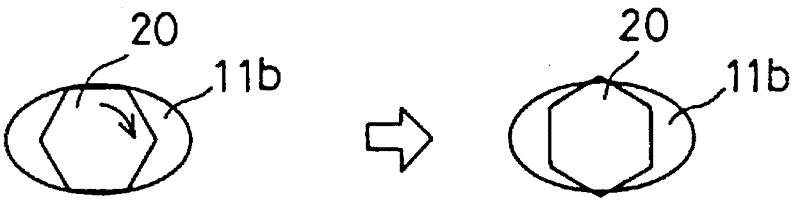
Figure 5C:
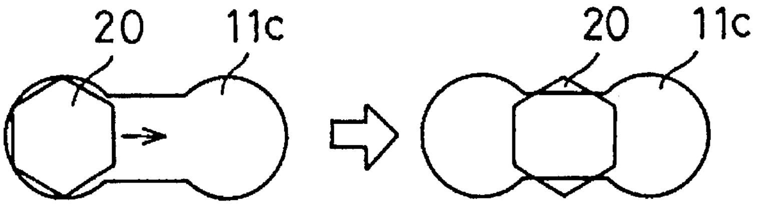
Figure 5D:
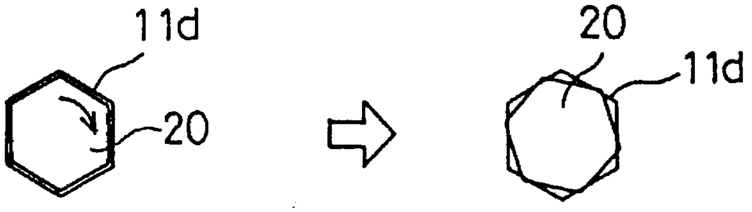

The dusting opening provided in the stop ring is not limited to an oval configuration. In the modification, as shown in FIGS. 5A, 5B, 5C and 5D, respectively, a rectangular opening 11*a*, an elliptical opening 11*b*, a keyhole-shaped opening 11*c*, or a hexagonal opening 11*d* can be provided in the stop ring 10. Any configuration of the dusting opening is allowed if the driver bit 20 can be inserted in the opening and the edge defining the narrower part can be engaged with the peripheral groove portion 21. As shown in FIG. 5C, when the keyhole-shaped opening 11*c* is provided in the stop ring 10, the narrower part of the opening can be engaged with the peripheral groove portion 21, by moving the stop ring 10 horizontally, instead of rotating the stop ring 10. As shown in FIG. 5D, when the hexagonal opening 11*d* is slightly larger in cross sectional area than the driver bit 20, by inserting the driver bit 20 in the opening 11*d* and rotating the driver bit 20, the edge surrounding the opening 11*d* can be engaged with the peripheral groove portion 21. The aforementioned narrower part is defined by the distance between the opposite sides of the opening 11*d*.

The oval opening 11 of the embodiment, the rectangular opening 11*a*, the keyhole-shaped opening 11*c* and the hexagonal opening 11*d* have the parallel narrower parts, respectively. These parallel narrower parts can easily catch the diagonal part of the driver bit 20 as compared with the elliptical opening 11*b*. The parallel narrower parts can securely catch both ends of the diagonal line of the driver bit, even if the position of the driver bit deviates from the desired position. Therefore, even when the adjustment sleeve 5 is strongly pulled with the peripheral groove portion of driver bit 21 engaged with the edge surrounding the dusting opening in stop ring 10, it can be prevented from being detached from the driver bit.

The edge defining oval opening 11 of the embodiment, the rectangular opening 11*a*, the elliptical opening 11*b* or the hexagonal opening 11*d* can more easily catch the driver bit as compared with the keyhole-shaped opening 11*c*. Because it can be easily confirmed that the driver bit is caught by the edge surrounding the dusting opening in the stop ring, by rotating the driver bit rather than by moving the driver bit in the opening. Even if an operator slip his/her hands off the driver bit 20 when applying force to extract the driver bit 20, the driver bit can be more firmly engaged with the edges surrounding the openings 11*a*, 11*b* and 11*d*, as compared with the opening 11*c*.

Figure 6:
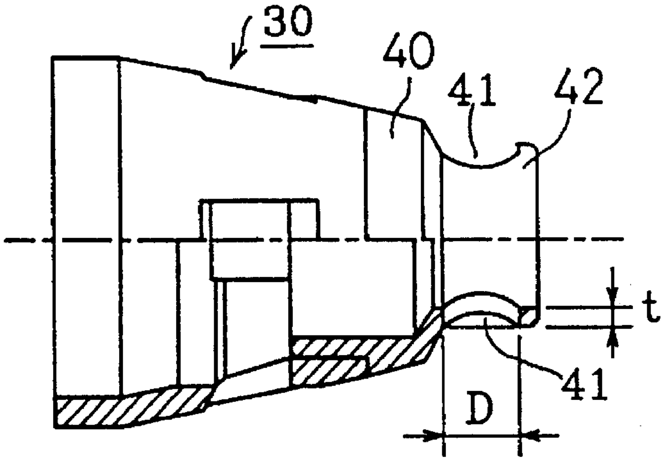
FIG. 6 is a diagrammatic representation showing an adjustment sleeve with a stop ring of a second embodiment attached thereto, the upper half of the figure shows the appearance of the adjustment sleeve and the lower half shows the cross section of the adjustment sleeve.
Figure 7:
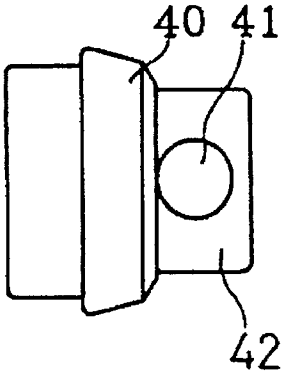
FIG. 7 is a plan view showing the stop ring of the second embodiment.

A second embodiment, as shown in FIGS. 6 and 7, is different from the first embodiment in that a circular opening 41 having a diameter D of 7.5 mm, instead of the oval opening, is opposed at an angle of 180 degrees in a peripheral wall of a cylindrical body 42 provided on the tip of a stop ring 40 in an adjustment sleeve 30 for use in a screwdriver. In the same manner as the first embodiment, the edge defining circular opening 41 has a thickness t of 2 mm, and the stop ring 40 is formed by forging S15C steel and is hardened by heat treating the forged S15C steel through carburizing process.

Figure 8A:
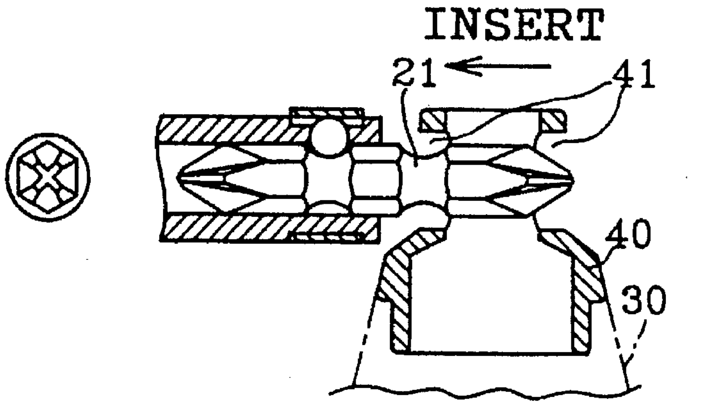
FIGS. 8A–8C are explanatory view showing a method of extracting the driver bit of the second embodiment.
Figure 8B:
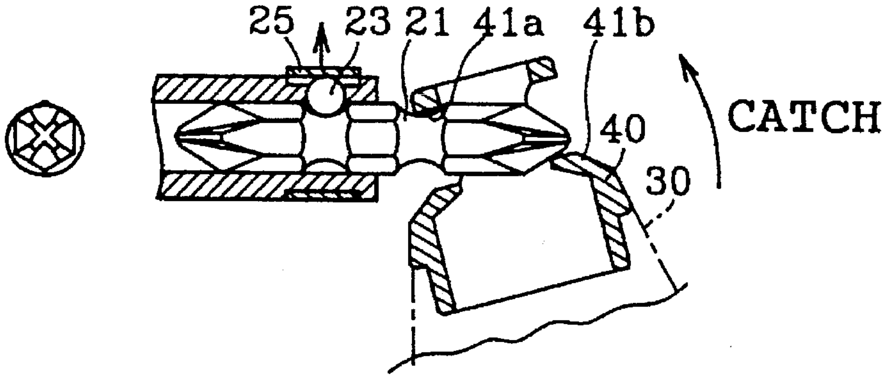
Figure 8C:
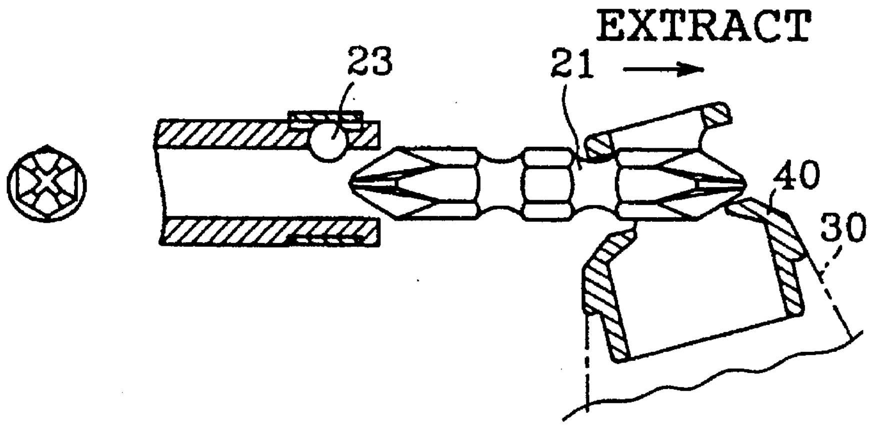

Since the circular opening 41 of the stop ring 40 larger in diameter than the diagonal length L2 of 7.34 mm of driver bit 20, as shown in FIG. 8A, the driver bit 20 can be easily inserted in the circular opening 41. As shown in FIG. 8A, when the edge defining circular opening 41 is in the area of the peripheral groove portion 21, the tip of the driver bit 20 is exposed from the opposite circular opening 41. Specifically, the diameter of the cylindrical body 42 is smaller than a length between the peripheral groove portion 21 and the tip of the driver bit 20. Subsequently, as shown in FIG. 8B, the stop ring 40 is slightly tilted such that the forward edge 41*a* surrounding one circular opening 41 is hooked on the peripheral groove portion 21 of the driver bit 20 and the rear edge 41*b* of the opposite circular opening 41 is pushed against the tip of the driver bit 20. Finally, as shown in FIG. 8C, by pulling the adjustment sleeve 30 with the stop ring 40 being tilted, the driver bit 20 can be easily extracted from the screwdriver.

Also in the second embodiment, an operator need not take with him/her a plier or other for detaching the driver bit, and never leaves the adjustment sleeve behind.

In the second embodiment, the circular opening 41 is provided in the stop ring 40. Alternatively, a square opening can be provided. Also, the keyhole-shaped opening 11*c* shown in FIG. 5C or the hexagonal opening 11*d* shown in FIG. 5D can be provided in the stop ring 40.

Figure 9:
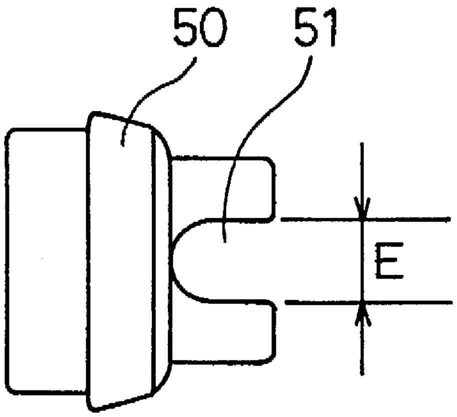
FIG. 9 is a plan view showing a stop ring of a third embodiment.
Figure 10:
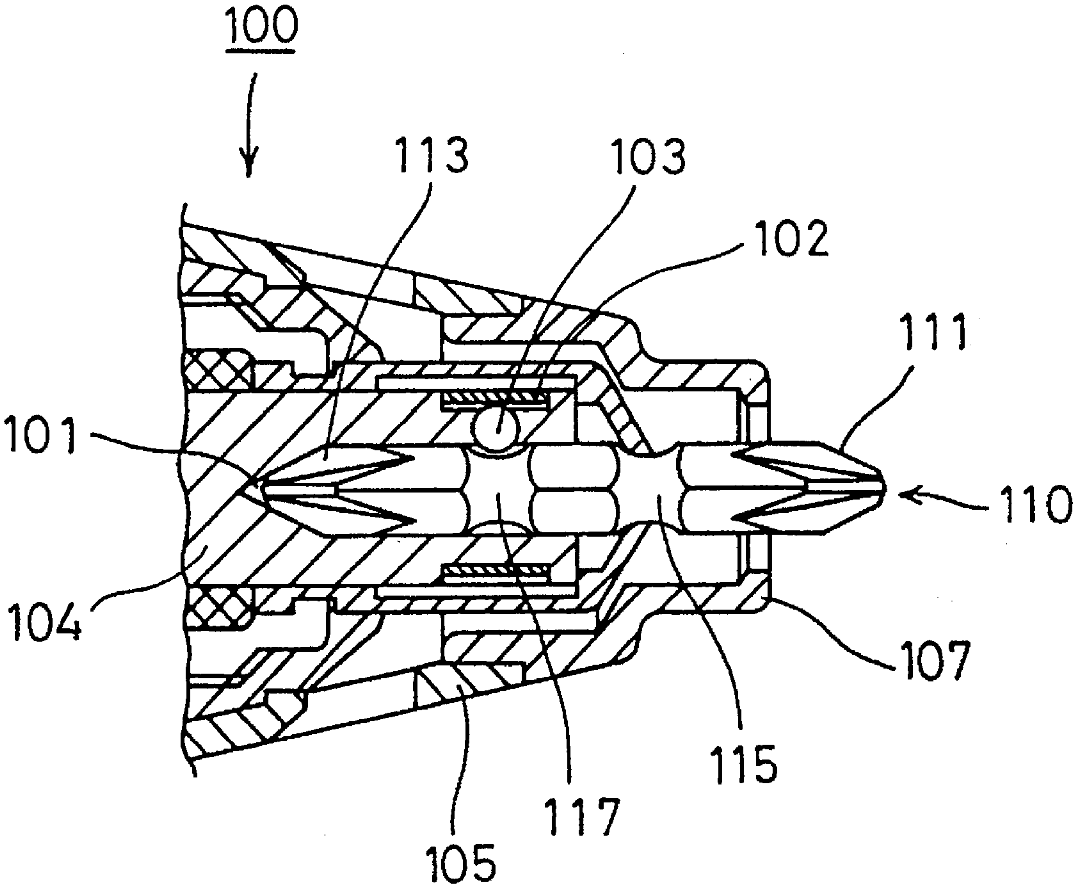
FIG. 10 PRIOR ART
FIG. 10 is an explanatory view of a prior-art screwdriver.

In the third embodiment shown in FIG. 9, a stop ring 50 is provided with a cut 51, i.e., a partly peripherally open dusting opening replacing the aforementioned peripherally closed dusting openings. In the third embodiment: (1) by inserting the driver bit 20 into the cut 51, and then rotating the driver bit 20, the diagonally opposite parts of the peripheral groove portion 21 of driver bit 20 is engaged with the edge defining the cut 51; and (2) after inserting the driver bit 20 into the cut 51, by tilting the adjustment sleeve relative to the driver bit 20, the peripheral groove portion 21 and the edge defining the cut 51 are engaged with each other.

In the aforementioned (1), a width E of the cut 21 is equal to the width B in the first embodiment. In the aforementioned (2), the width E of the cut 21 is equal to the width D in the second embodiment. Specifically, the aforementioned (1) is a method corresponding to the method of the first embodiment and (2) is a method corresponding to the method of the second embodiment.

The aforementioned (1) and (2) are almost the same as the first and second embodiments, respectively, except that the dusting opening is partly peripherally open. Therefore, the third embodiment is not detailed. In the third embodiment, since the dusting opening is not peripherally closed entirely, the driver bit is inserted via an open end into the dusting opening. Therefore, the driver bit can be easily inserted.

The cut 51 can have a cross section provided with the configurations shown in FIGS. 5A–5D. When the cross section is rectangular or elliptical, a short side of the rectangular cross section or an axially shorter side of the elliptical cross section is open. When the cross section is key-hole shaped, a insertable part of the cross section is open and a narrower part of the cross section is closed. In the same manner as the first and second embodiments, the edge defining the cut 51 is hardened such that it can be repeatedly used.

This invention has been described above with reference to the preferred embodiment as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

What is claimed is:

1. A method of detaching a driver bit from a screwdriver having a removable adjustment sleeve, said adjustment sleeve being provided with a stop ring and a dusting opening provided in the stop ring, the dusting opening being at least partially defined by a bit engaging edge in a peripheral wall of the stop ring, the method comprising the steps of:

removing the adjustment sleeve from the screwdriver;

at least partially inserting a shaft of the driver bit into the dusting opening;

engaging the bit engaging edge of the peripheral wall with a peripheral groove portion provided in the shaft of the driver bit; and extracting the driver bit from the screwdriver by an extraction motion while maintaining engagement between the bit engaging edge with the peripheral groove portion of the driver bit.

2. A method according to claim 1, wherein the dusting opening is defined by an annular surface of the peripheral wall, and the step of inserting the shaft into the dusting opening includes the steps of: disposing the adjustment sleeve relative to the driver bit such that the dusting opening is aligned with the shaft; and bringing the adjustment sleeve close to the driver bit while the dusting opening is still aligned with the shaft.

3. A method according to claim 1, wherein the dusting opening is only partially defined by the peripheral wall and is partially open to the external environment, and the step of inserting the shaft into the dusting opening includes the step of bringing the adjustment sleeve close to the driver bit such that the driver bit is inserted via an open end of the dusting opening.

4. A method according to claim 1, wherein at least two dusting openings are provided in the peripheral wall of the stop ring and the at least two dusting openings communicate with one another, and the method further comprising the steps of:

engaging an edge surround a first dusting opening provided in one end of the stop ring with the peripheral groove portion; and tilting the adjustment sleeve such that an edge surrounding a second opening provided in a remote end of the stop ring is pushed against a tip of the driver bit, extracting the driver bit from the screwdriver while the adjustment sleeve is tilted relative to the screwdriver.

5. A method according to claim 1, wherein the engaging step further includes the step of catching the peripheral groove portion in a narrower part of the dusting opening.

* * * * *